Figure 1:
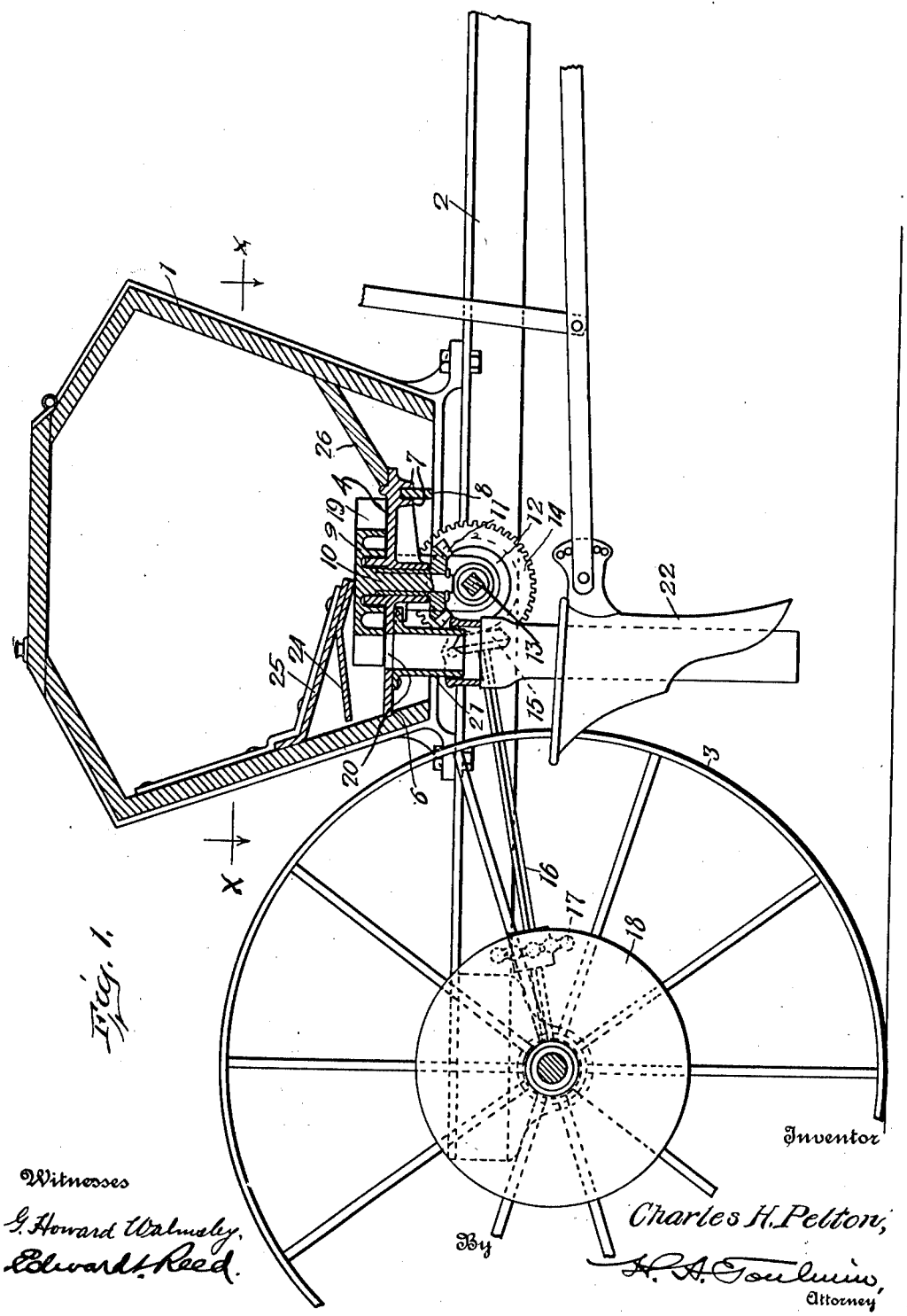

C. H. PELTON.
FERTILIZER DISTRIBUTER.
APPLICATION FILED DEC. 27, 1910.

1,061,400.

Patented May 13, 1913.
2 SHEETS—SHEET 1.

Witnesses
G. Howard Walmsley.
Edward Reed.

Inventor
Charles H. Pelton,
By H. A. Toulmin,
Attorney

C. H. PELTON.
FERTILIZER DISTRIBUTER.
APPLICATION FILED DEC. 27, 1910.
1,061,400.
Patented May 13, 1913.
2 SHEETS—SHEET 2.
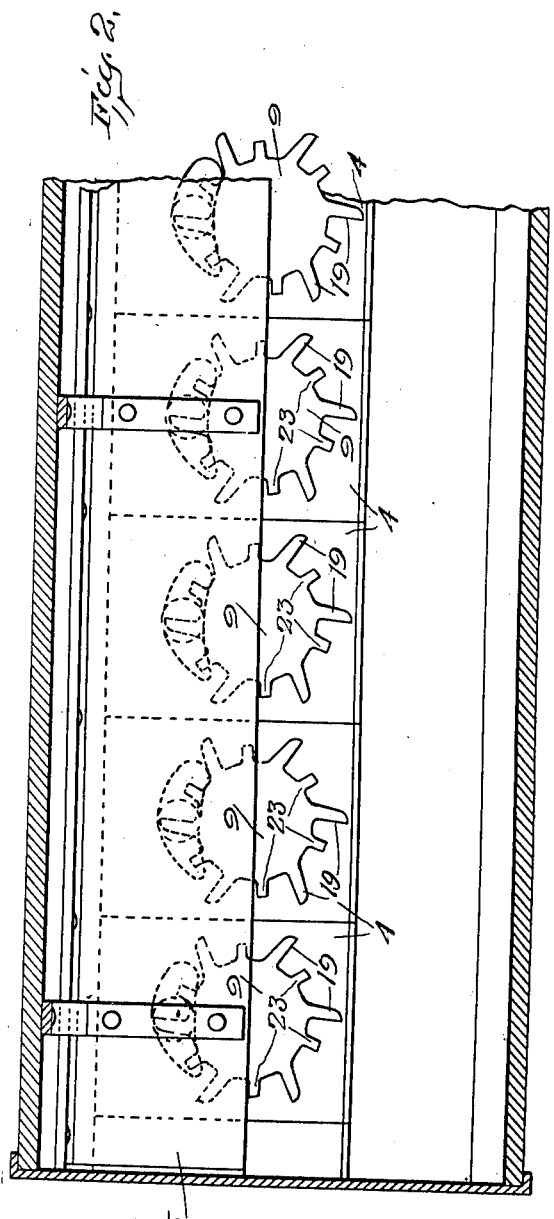
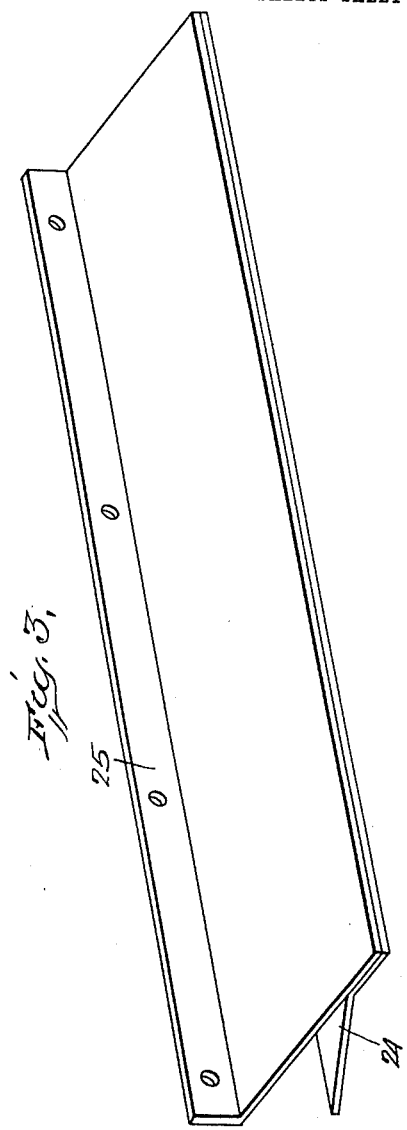

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

FERTILIZER-DISTRIBUTER.

1,061,400.         Specification of Letters Patent.         Patented May 13, 1913.

Application filed December 27, 1910. Serial No. 599,312.

*To all whom it may concern:*

Be it known that I, CHARLES H. PELTON, a citizen of the United States, residing at Springfield, in the county of Clark and State of Ohio, have invented certain new and useful Improvements in Fertilizer-Distributers, of which the following is a specification, reference being had therein to the accompanying drawings.

This invention relates to fertilizer distributers.

The fertilizer distributers now in general use have two defects. In the normal operation of the distributer the fertilizer will accumulate in the hopper in the rear of the discharge opening, and, when the machine comes to a stop this fertilizer will gravitate through the discharge opening and to the ground, thus causing a waste of a very considerable quantity of fertilizer each time the machine stops and also causing considerable quantities of fertilizer to be discharged in one place which is undesirable. Again, the feeding devices of the fertilizer distributers now in general use will feed to the discharge openings lumps of fertilizer of a size sufficient to choke the discharge opening or the tube leading therefrom.

The object of the present invention is to overcome these defects by providing means to prevent the accumulation of the fertilizer at a point which will permit it to gravitate through the discharge opening and by providing the feeding devices with means for crushing the lumps of fertilizer.

In the accompanying drawings, Figure 1 is a sectional view, taken transversely to the hopper of a fertilizer distributer; Fig. 2 is a horizontal, sectional view, taken on the line $x$ $x$ of Fig. 1, and looking in the direction of the arrows; and Fig. 3 is a perspective view of the guard and its supporting plate.

In these drawings I have illustrated one embodiment of my invention and have shown the same applied to a fertilizer distributer of a well known type and comprising a hopper 1 mounted upon a frame 2, which, in turn, is mounted on ground wheels 3. The hopper 1 has a substantially flat bottom near the center of which are arranged the feeding devices and having formed therein between the feeding devices and the rear wall of the hopper discharge openings for the fertilizer. In the present instance the bottom of the hopper is formed of a series of plates 4 each having its rear edge mounted in a recess 6 in the rear wall of the hopper and provided near its forward edge with depending lugs 7 adapted to extend on opposite sides of a bar 8 supported lengthwise of the hopper beneath the bottom thereof. This construction permits the plates to be removed without the use of tools. A series of feeding devices are arranged longitudinally to the hopper and each of these feeding devices comprises a disk-like member 9 mounted upon a shaft 10 rotatably mounted near the center of one of the plates 4 and provided at its lower end with a bevel gear 11 which meshes with a bevel gear 12 mounted on a shaft 13 which is positively driven from the ground wheels. This driving means preferably comprises a bevel gear 14 rigidly secured to the shaft 13 and meshing with a bevel pinion 15 carried by a shaft 16 extending rearwardly therefrom and having a pinion 17 which meshes with a gear 18 on the axle of the ground wheel 3. As stated, each of the feeding devices comprises a disk-like rotary member and each member is provided with a series of feeding teeth 19 which engage the fertilizer contained within the hopper and carry the same rearward to a suitable discharge opening. In the present instance each plate 4 is provided with a discharge opening 20 arranged between the axis of the feeding device and the rear wall of the hopper. This discharge opening communicates with a tube 21 leading downward through a boot 22 and adapted to deliver the fertilizer into the furrow opened by the boot.

In order to properly feed the material it is desirable that the teeth 19 should be of considerable length and should be placed some distance apart, but, when so arranged, these teeth permit lumps of fertilizer of considerable size to pass between them and these lumps not infrequently become lodged in the discharge opening or the tube leading therefrom and interrupt the flow of fertilizer through that opening. To prevent this clogging of the discharge opening I provide the feeding devices with means to crush the lumps and this means preferably consists of a series of crushing teeth 23 of a length less than the length of the feeding teeth 19 and arranged alternately with the teeth 19. The length of these teeth is such that they will not interfere with the feeding of the fertilizer, but should a lump of material enter the space between the teeth it will be crushed between the tooth 23 and an adjacent coöperating device, such as one of the teeth of the adjacent feeding device. In the operation of a feeding device of this character there is a tendency on the part of the fertilizer to accumulate in considerable quantities against the rear wall of the hopper and to escape through the discharge openings 20 when the machine comes to a stop and the feeding devices cease to move. To prevent this escape of the fertilizer I have arranged a substantially horizontal guard plate 24 above the discharge opening a distance sufficient to permit the free rotation of the feeding device between the bottom of the hopper and the guard plate. This guard plate extends from a line close to the rear wall of the hopper to a line near the axes of rotation of the feeding devices and effectually prevents the accumulation of any considerable quantity of fertilizer adjacent to the discharge openings. The guard plate may be supported in any suitable manner, but I prefer to secure the same to a second plate 25, which, in the present instance, is rigidly secured to the guard plate 24 and extends from end to end of the hopper. This plate is rigidly secured to the rear wall of the hopper and extends downwardly and forwardly to its point of connection with the forward edge of the guard plate and has two functions, first, to support the guard plate 24 in proper relation to the discharge opening and feeding device, and second, to form an incline which will cause the fertilizer to gravitate toward the center of the hopper where it can be acted upon by the feeding devices. I have also arranged an inclined plate 26 in the forward portion of the hopper to cause the fertilizer to gravitate toward the center thereof, and to hold the bottom plates against displacement.

The operation of the device will be readily understood from the foregoing description and it will be apparent that I have provided means which will effectually prevent the escape of any material quantity of fertilizer after the machine and its feeding devices have come to a stop; and further that I have provided means for crushing all lumps of fertilizer of a size sufficient to choke the discharge opening or the tube leading therefrom.

While I have, for the purpose of illustration, shown one form of the device, it will be apparent that the particular construction of the parts is immaterial and I, therefore, wish it to be understood that I do not desire to be limited to the details of construction shown and described, for obvious modifications will occur to a person skilled in the art.

Having thus fully described my invention, what I claim as new and desire to secure by Letters Patent, is—

1. In a fertilizer distributer having a plurality of feed openings, a plurality of feeding devices movably mounted adjacent to the respective openings to feed the fertilizer through the same, and a guard mounted in said hopper and having a lower surface extending in a substantially horizontal plane from a point above and close to said feeding devices to a point near the rear wall of said hopper and serving to prevent the fertilizer from accumulating about said feed openings.

2. In a fertilizer distributer having a plurality of feed openings, a plurality of feeding devices rotatable about vertical axes to feed the fertilizer to the respective feed openings, a device mounted in said hopper having an inclined longitudinal surface and extending from the rear wall of said hopper to a point close to said feeding device and in front of said feed openings and also having a lower surface extending in substantially a horizontal plane from a point above and close to said feeding device to a point near the rear wall of said hopper and serving to prevent the fertilizer from accumulating about said feed opening.

3. In a fertilizer distributer, the combination with a hopper having a feed opening and a feeding device rotatable about a vertical axis to feed the fertilizer to said opening, of a device to prevent the fertilizer from accumulating about said feed opening, comprising a guard member supported above the said opening and having its lower surface extending substantially in a horizontal plane from a point above and close to said feeding device to a point near the rear wall of said hopper.

4. In a fertilizer distributer, a hopper having a plurality of discharge openings, a guard plate supported above said openings, a plurality of rotary feeding devices mounted in said hopper near the respective discharge openings, each of said devices having a series of feeding teeth, and crushing teeth arranged between the feeding teeth and of less length than the latter.

5. In a fertilizer distributer, a hopper having a discharge opening, a feeding device comprising a rotary disk-like member arranged in a plane substantially parallel with the plane of said discharge opening and having a series of teeth projecting from the periphery thereof for feeding the fertilizer to the discharge opening and having a second series of teeth of less length than the teeth of the first-mentioned series and arranged alternately with the teeth of the first-mentioned series, and a device supported adjacent to and coöperating with the teeth of said disk-like member to crush the lumps of fertilizer..

In testimony whereof, I affix my signature in presence of two witnesses.

CHARLES H. PELTON.

Witnesses:
 E. O. HAGAN,
 HARRIET L. HAMMAKER.